United States Patent [19]
Rainwater et al.

[11] 3,764,716
[45] Oct. 9, 1973

[54] PREPARATION OF DEHYDRATED MASHED POTATOES

[75] Inventors: Joe H. Rainwater; Roderick G. Beck, both of Blackfoot, Idaho

[73] Assignee: American Potato Company, Vacaville, Calif.

[22] Filed: Nov. 16, 1970

[21] Appl. No.: 90,107

Related U.S. Application Data

[63] Continuation of Ser. No. 222,538, Sept. 10, 1962, abandoned, which is a continuation-in-part of Ser. No. 139,760, Sept. 21, 1961, abandoned.

[52] U.S. Cl.................... 99/207, 426/457, 426/464, 426/482, 426/510, 426/431
[51] Int. Cl................................................ A23b 7/03
[58] Field of Search.................... 99/100 P, 207, 139

[56] References Cited
UNITED STATES PATENTS

| | | | |
|---|---|---|---|
| 3,261,695 | 7/1966 | Sienkiewicz et al. | 99/207 |
| 2,759,832 | 8/1956 | Cording, Jr. et al. | 99/207 |
| 2,856,290 | 10/1958 | Peebles | 99/139 |
| 2,900,256 | 8/1959 | Scott | 99/DIG. 4 |

FOREIGN PATENTS OR APPLICATIONS

| | | | |
|---|---|---|---|
| 566,828 | 1/1945 | Great Britain | 99/207 |

OTHER PUBLICATIONS

Burton, W. G. Mashed potato Powder II Spray Drying Method, Journal of the Society of Chemical Industry (London), 7/1944, (pp. 212–215).

Petty, Chemical Engineers' Handbook, 3rd ed., 1950, McGraw–Hill Book Company, Inc. N.Y., (p. 864).

*Primary Examiner*—David M. Naff
*Attorney*—Morton, Bernard, Brown, Roberts & Sutherland

[57] ABSTRACT

A process for producing a dehydrated mashed potato product from an incompletely peeled and trimmed potato, including the steps of controlled mashing, slurrying and screening to remove all of the peels, eyes, rot and debris without damaging the potato cell prior to the final dehydration of the potato.

6 Claims, 3 Drawing Figures

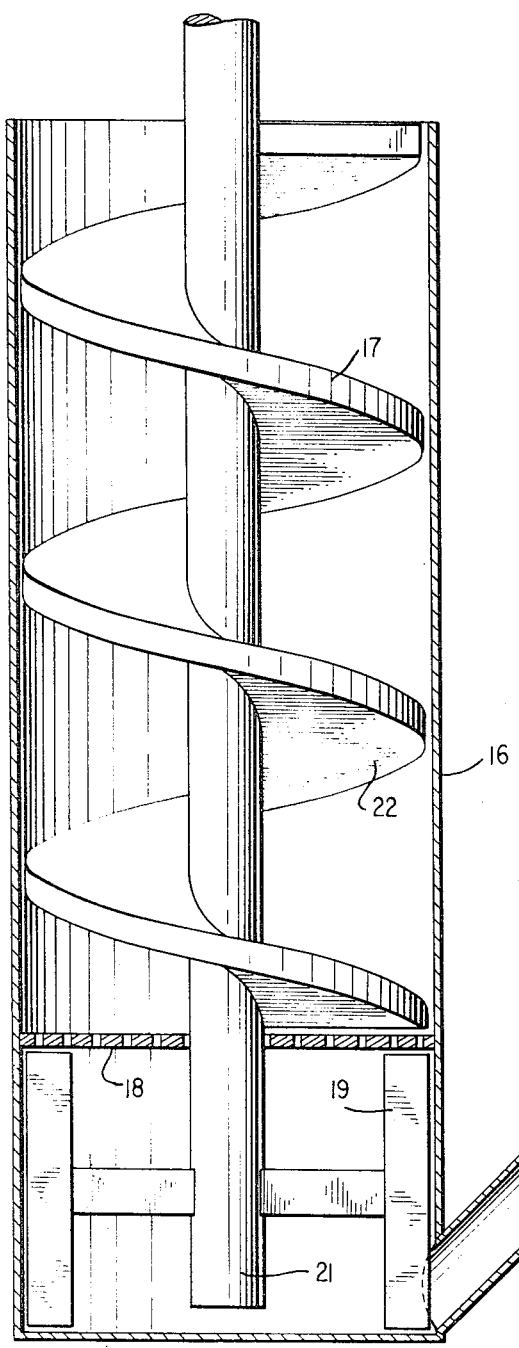
FIG. 2
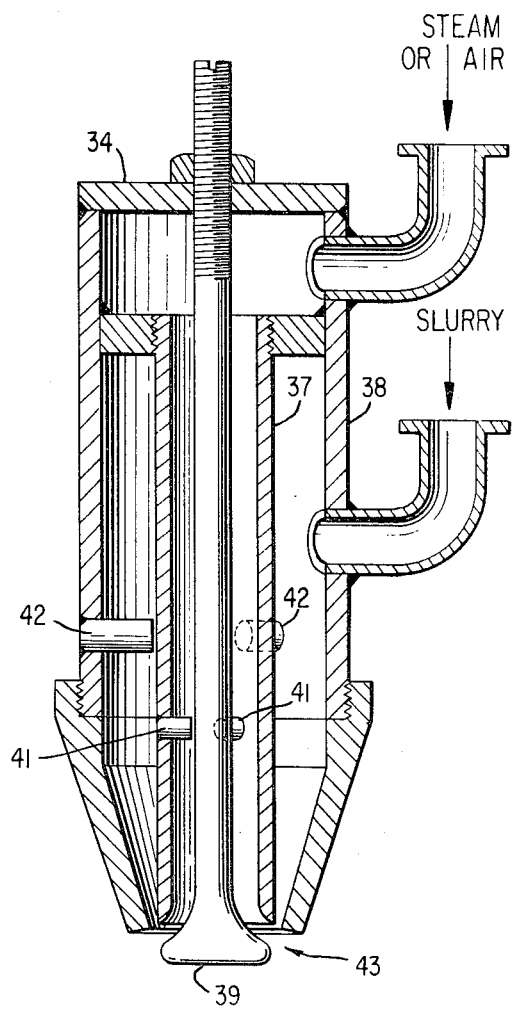
FIG. 3
INVENTORS
JOE H. RAINWATER
RODERICK G. BECK
BY
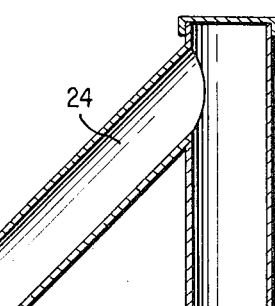
ATTORNEYS

PREPARATION OF DEHYDRATED MASHED POTATOES

CROSS REFERENCE TO RELATED APPLICATIONS

This application is a continuation of application Ser. No. 222,538, filed Sept. 10, 1962, and now abandoned, which application is a continuation-in-part of Ser. No. 139,760, filed Sept. 21, 1961, and now abandoned.

Although potatoes have been available as a fresh vegetable for many years, it is only during the past decade that the general public has accepted a dehydrated mashed potato as a satisfactory consumer product. Only recently have satisfactory processes been perfected to overcome the complaints of earlier products such as poor flavor, pastiness, poor color, and short storage life. The dehydrated mashed potato products presently available and acceptable are produced either as "granules" by the "add-back" process or as "potato flakes."

The prior art discloses many other processes, including spray drying, said to produce granular dehydrated potato products. None of these other disclosures have produced dehydrated mashed potato products which were commercially acceptable. Prior to our invention, there has been no attempt to produce, by a continuous spray-drying process, a dehydrated mashed potato product comparable to add-back potato granules as described by Templeton, U.S. Pat. No. 2,788,732, or potato flakes as described by Willard and Cording, U.S. Pat. Nos. 2,759,832; 2,780,552, and 2,787,553. While both add-back potato granules and potato flakes have received wide commercial acceptance, both have inherent disadvantages which limit their use. These can be enumerated as follows:

DISADVANTAGES OF POTATO FLAKES

1. Potato flakes inherently are a sensitive product because of damage which occurs to the cells during the coated-drum drying process. Only by the addition of many corrective additives and extra processing has this product gained commercial acceptance.
2. Potato flakes cannot be rehydrated in boiling water without development of pastiness.
3. Potato flakes cannot be whipped or vigorously mixed during reconstitution without appreciable texture damage.
4. Potato flakes have a very low density which makes packaging expensive and inert gas packing impractical. Without the protection of inert gas packing, rancidity usually develops.
5. Potato flakes cannot be reduced in size to increase density without cell rupture which increases pastiness.

DISADVANTAGES OF ADD-BACK POTATO GRANULES

1. Add-back potato granules do not fully rehydrate in cold water and do not absorb as much liquid as a corresponding weight of potato flakes.
2. Add-back potato granules, by the nature of the process by which they are produced, are rehandled and redried many times. This can and does frequently produce process flavors.
3. Add-back granules absorb hot liquid so rapidly that all particles must be wetted before stiffening of the mix occurs. If the addition of the dry product to the liquid is not done quickly and with vigorous stirring, dry lumps can be formed.

From the above, it is obvious that an improved product having all of the assets of add-back potato granules and potato flakes and none of the disadvantages would be extremely desirable. Our invention relates to the preparation of a damage-free and debris-free slurry consisting substantially entirely of unicellular potato particles suspended together with the desired additives in sufficient water to be sprayable without damage, to a continuous spray-dry process for drying such a slurry, and to a resulting product which meets the exacting criteria just laid down.

It is an object of this invention to provide a continuous process which produces a new and improved dehydrated mashed potato product embodying none of the disadvantages of "add-back granules" and "potato flakes."

It is a further object of this invention to provide a product which is not discolored in processing and accordingly is lighter and brighter in color than other dehydrated mashed potato products now in existence.

It is a further object of this invention to provide a dehydrated mashed potato product having an improved rehydrated color which does not darken when held at a high temperature, as on the steam table.

It is a further object of this invention to provide a product which can be fully rehydrated in cold water or boiling water to form a mealy mashed potato with a high ratio of water to dry matter.

It is a further object of this invention to provide a granular dehydrated mashed potato product which will absorb as much or more liquid than absorbed by potato flakes and still result in a mealy mashed potato.

It is a further object of this invention to provide a unicellular dehydrated mashed potato product which can be rehydrated in boiling water and mixed or whipped without damaging its mealy texture.

It is a further object of this invention to provide a second novel multicellular dehydrated mashed potato product composed of groups of previously separated potato cells adhering to each other and which can be added directly to water and which will rehydrate completely without stirring.

It is a further object of this invention to provide a second novel multicellular dehydrated mashed potato product composed of groups of previously separated potato cells adhering to each other which, when covered with water, will rehydrate completely without stirring.

It is a further object of this invention to provide a second novel multicellular dehydrated mashed potato product composed of groups of previously separated potato cells adhering to each other such that the product is entirely different in appearance and density in the dry form from any other dehydrated mashed potato product.

It is a further object of this invention to produce the above novel dehydrated mashed potato products with milk solids incorporated during the processing.

These and other objectives and advantages of the process will appear in the following specification taken in conjunction with the accompanying drawings.

FIG. 2 illustrates, in cross-section, the mixer we prefer to use.

FIG. 3 illustrates, in cross-section, our preferred nozzle for introducing the slurry into the spray dryer.

Figure 1:
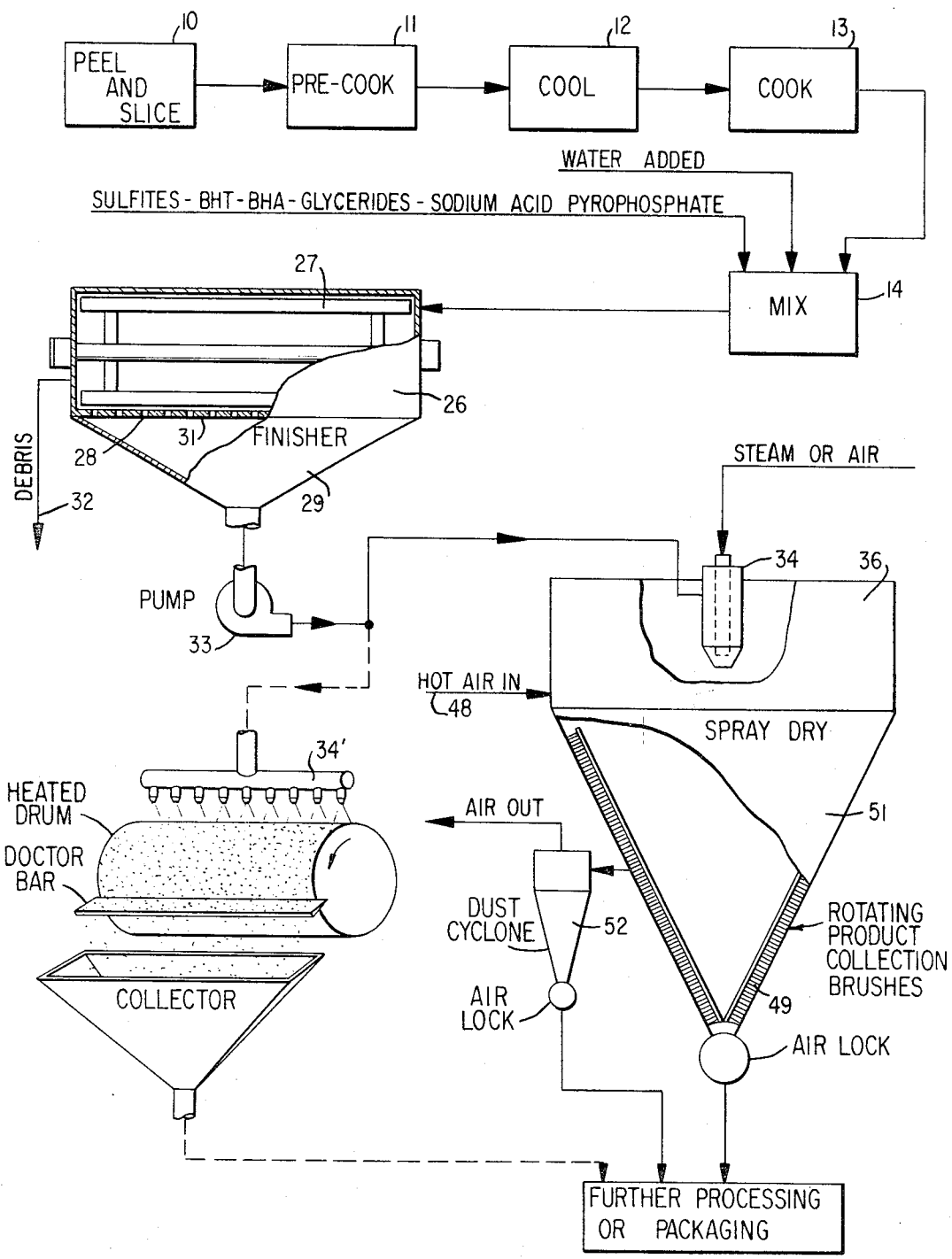
FIG. 1 illustrates, in the form of a flow sheet, the preferred embodiment of the process.

In our new process, the potatoes are washed, peeled, sliced, and prepared for cooking in a conventional manner. In order to produce all the desired objectives in a product having the characteristic flavor and color of mashed potatoes produced from boiled potatoes, the potatoes must be peeled as at 10, since peeling results in imporved color, both dry and after rehydration, as well as the desired bland flavor. In prior art, the reasons for peeling have not been understood and hence peeling has often been treated as an optional step. Our tests have shown that when potatoes are cooked unpeeled, strong peel flavors are driven into the starchy interior along with substances which cause the rehydrated end product to lose color rapidly when held at a high temperature as on a restaurant steam table. These undesirable flavor and color conditions persist even if all peel fractions are completely eliminated in subsequent processing.

Immediately following the removal of the peel at 10, the potatoes are sliced, rinsed to remove free starch, and immersed in water. If precooking is used, the rinsed potatoes may preferably be introduced directly into the precooking water.

The water precooking 11, cooling 12, and final steam cooking 13 may follow accepted prior art. We prefer to precook and cool since this yields, after cooking, a potato cell more resistant to possible damage in the following steps.

Immediately following the cooking step 13, the cooked potatoes are continuously mixed or mashed with the addition of water, conveniently containing the desired additives in solution, to produce a free-flowing slurry. We have found that this slurry should contain 17 percent or less in potato solids, and is preferably in the 10–14 percent potato solids range. The purpose of this mixing step is to make a substantially homogeneous slurry the solids of which consist of a small fraction of debris in the form of peel, eyes, rot, fibers and undercooked spots of flesh and the balance of wholesome, cooked potato flesh, approximately 70–90 percent in the form of intact single potato cells — the balance being small lumps of unmashed cooked potato in the order of one-fourth inch diameter. This can be accomplished in mixers of various designs. The mixer shown in FIG. 2 consists of a cylindrical housing 16 which receives a screw 17. A perforated wall 18 divides the mixer 14 to form a lower chamber which accommodates a paddle assembly 19 which is mounted upon shaft 21 upon which flight 22 of screw 17 is also mounted. The water and potato material is fed by the screw 17 through the coarse perforations in wall 18 into the lower chamber where the paddles 19 mix the resulting slurry. It is then fed through the conduit 24 to the finisher 26.

As an alternative to peeling and steam cooking, where a baked potato flavor is desired, the raw potatoes may be scrubbed and baked in the ordinary way. After the potatoes are done, they are sent to the mixer unpeeled, but quartered or otherwise cut-up as necessary to facilitate the mixing. The baking produces a water loss of about 25 percent, which must be fully made up in the mixing process to adjust the potato solids content of the slurry to the limits already indicated. A different mixer design is required from that shown in FIG. 2 to avoid clogging of the perforated plate 18 by the peels. Surprisingly, the baked potato flavor carries through the subsequent processing into the finished product and it is an advantage of our process that the "finishing" step to be described later permits ready removal of the peel from the slurry when processing baked potatoes. Moreover, since the slurry is directly dried without add-back, the processing line can switch directly and immediately from baked to boiled and back as desired.

A mixing step is necessary in order to prepare the slurry for subsequent processing steps. The following must be observed:

1. Water must always be present when mashing takes place. It serves as a lubricant and prevents damage to the fragile cooked cells.
2. Additives include sulfite salts, mono and diglycerides, sodium acid pyrophosphate, and antioxidants such as BHA and BHT. Our tests indicate that this is the most advantageous point to incorporate these additives.
3. In this mixing step, temperature is controlled in the range of 130°–150°F in order to best assist in cell separation and beneficial effects of the additives.
4. Where a complete prepared mashed potato product is desired, making it unnecessary for the user to add milk, our process permits an improved product to be produced by adding either fluid milk in lieu of all or part of the water or dried milk solids at this mixing stage.

The final step in the production of the novel sprayable slurry of our invention is the "finishing" step which substantially completely separates the potato flesh into individual, discrete, undamaged cells and simultaneously removes all debris. We have found that, surprisingly, this can be done continuously in a conventional finisher or pulper 26 of the type which is widely used in the canning industry for removing seeds and skin from fruits and vegetables, if the operation of the device is properly controlled. Rotary paddles 27 operating with proper clearance break up substantially all the wholesome potato flesh into unicellular particles or particles consisting of clumps of only a few cells which flow in the thus "finished" slurry through perforations 28 of predetermined size into a receiving hopper 29. Debris is retained on the screen 31 and is discharged continuously from a separate outlet 32. It is a surprising fact that this debris contains all the rot that may be in the cooked potato even when test runs are made with potatoes having commercially wholly unacceptable proortions of rot even in excess of 50 percent. The speed of rotation of the paddles 27 and size of perforations 28 used in the finisher 26 must be selected so that the small remaining potato lumps of wholesome flesh are separated into individual cells without damaging the delicate potato cell walls.

Even with the preceding mixing step which is included primarily to reduce cell damage, we find that the operation of this finishing step is quite critical. Speed, screen hole size, and paddle clearance must be optimized for any given slurry solids content. As a specific example, for a slurry of 12 percent potato solids in our equipment, we have found that 60 rpm, 0.045 inch perforations, and one-fourth inch paddle clearance gives us a slurry consisting of more than 90 percent intact unicellular cells. The remainder consists of groups of two or three attached, undamaged cells. With slurry as low as 10 percent solids, perforations as small as 0.023 inch are satisfactory; at 17 percent, 0.060 inch are needed.

The pulper or finisher 26 is generally available device and is intended to be operated at rotation speeds in the range from 680–780 rpm. Such specified speeds would be wholly unacceptable in producing the slurry of our invention, for we have found cell damage in undesirable amounts at speeds as low as 100 rpm.

During times of certain abnormal raw potato characteristics, a revision of the process to this point is advantageous. When abnormally cold weather is experienced at harvest time or when the potatoes have been stored for long periods at low temperatures, a buildup of undesirable reducing sugars occurs. These sugars not only give an unnatural sweet flavor, but react with nitrogenous components of the potato both during processing and in subsequent storage of the dried finished product to produce a browning discoloration — known as non-enzymatic browning. When these conditions exist, water without additives may be used in the production of the slurry. The finished slurry is dewatered by filtering, centrifuging or comparable means. The separated clear fluid will contain the bulk of sugars present in addition to any other water soluble components. This can be discarded and replaced by additional water containing the additives. Our test using this variation of the procedure on potatoes with high sugar content resulted in a finished product of superior color, extremely mild flavor, and excellent color stability during storage. Although this added step can always be used, we prefer to employ it only in cases of high sugar content, in cases where an extremely mild flavor is required, or in cases where, for other unknown reasons, the raw material produces finished products of poorer color.

A slurry of the undamaged debris-free quality produced by the process of our invention already described is essential to the subsequent production of an acceptable dehydrated mashed potato product by spray-drying. The spraying can be either into a stream of hot air or onto a heated surface.

The slurry discharged by the finisher 26 can be pumped without damage by a conventional lobe-type pump 33 to a dispersing device 34, which in FIG. 1 is shown mounted in the top of a drying chamber 36. We have experiencd unacceptable cell damage using a centrifugal pump at this stage.

Some dispersing devices used in conventional spray drying were found to cause excessive potato cell rupture. Nozzle or disk design and atomizing fluid pressures and velocities are cirtical because potato cells can be damaged by excessive pressure, abrasion, or fluid acceleration.

We have found that commercial one-fluid nozzles which rely on pressure in the dispersed fluid are much more damaging and give poorer dispersion than commercial two-fluid nozzles. The latter can be made to operate satisfactorily if an appropriate standard tip shape is selected and the hot air, dry steam or other dispersing gas used is carefully regulated as to pressure and volume to get proper slurry dispersion without excessive cell damage. We prefer, however, a special nozzle design of our invention which may be adjusted to a variety of operating conditions and obtain effective dispersion without damage to potato cells.

We have also found that centrifugal disks, if used as conventionally used in the spray-drying of milk will produce excessive cell damage. However, centrifugal dispersing bowls can be made to work if the slurry is carefully deposited, and the acceleration sufficiently gradual. Nozzle or disk design alone, however, cannot guarantee undamaged dispersion if unacceptable pressures, abrasions, or accelerations are permitted to occur. The prior art indicates no awareness of the critical relationships between nozzle or disk design, operating conditions, and product quality.

FIG. 3 shows our preferred nozzle design. The slurry flows in the annulus between two concentric pipes 37 and 38. The dispersing gas — most conveniently air or steam — flows through the inner pipe 37. The longitudinally adjustable mushroom-headed stem 39 is located concentrically within inner pipe 37. It is held centered and steadied against vibration by a plurality of locating pins 41. Similarly, the inner pipe 37 is spaced and held in relation to outer pipe 38 by a plurality of locating pins 42. At the exit 43 of the nozzle, the two fluids mix so that the potato slurry is dispersed in a conical-shaped pattern. The size and shape of this pattern can be controlled by changing the position of the head of the stem 39. Thus, the nozzle can be adjusted so the dispersed slurry does not contact the walls of dryer 36.

The spray is introduced into a chamber 36 supplied with air at 48 heated in the range of 250°–400°F in sufficient quantity to dry at the desired rate. It is desirable that the air flow be uniformly distributed in the dryer 36 and that the dryer 36 be of such height as to give approximately 15 seconds or more contact time between the air and dispersed particles. The bottom of the dryer, which may be either sloped or flat, is continuously swept by nylon brushes 49.

To produce a predominantly unicellular product similar in size to add-back granules, conditions of slurry feed rate, air temperature, and air flow are adjusted so that all particles are dried below the adhering stage before reaching the floor 51 of the dryer 36.

To produce a predominantly multicellular product, dryer conditions are adjusted so that some damp particles fall on the dryer floor 51 where they serve as nuclei for multicellular units formed by the rolling action of the brush sweep 49. By moisture interchange, these multicellular units equilibrate at a moisture of 6–14 percent. If this final moisture is higher than desired for finished product storage, dryer conditions can be altered or the product can be further dried by conventional means such as a fluid bed dryer (not shown).

In all cases, the finest potato particles (5–30 percent of the potato solids, depending upon dryer design and operating conditions) are entrained in the air leaving the dryer and must be recovered from the air by cyclone separators 52, settling chambers, or bag collectors. This fraction is unicellular and can be combined with the balance of the product swept from the dryer floor.

To produce a product consisting of practically 100 percent multicellular units, an additional step is used. The fine fraction from the collection system 52 is combined with the unicellular material which has been separated by screening from the fractions deposited on the dryer floor 51. Water is uniformly added to bring the moisture content to the range of 20–40 percent while the product is subjected to a rolling and tumbling action. We prefer to do this continuously by spraying a fine water mist into the product as it passes through a rotating horizontal drum (not shown) equipped with lift flights and baffles. At this elevated moisture, the particles adhere to form multicellular units. If milk solids are desired in the multicellular product, and have not already been completely added in the earlier mixing step, milk solids as desired can be included in the rewetting liquid and when so included assist in promoting particle adhesion. The size of the units can be controlled by varying the moisture level; as moisture increases, unit size increases. The multicellular units thus formed are then subjected to a gentle final drying operation such as in a vibratory or fluid bed dryer. We have found that the above rewetting and drying operation also improves the mealiness of the finished mashed potato product. A further improvement yet in mealiness can be obtained by instituting a holding step between the rewetting and final drying steps. We have found that longer times, lower temperatures, and moistures in the range of 30 percent all promote this improvement in mealiness.

This "rewet" multicellular product can then be combined with the multicellular fraction from the dryer floor 51.

As shown by the dotted line flow arrows from pump 31 in FIG. 1, the slurry discharged from the finisher 26 can alternately be fed to a plurality of discharge devices 34', which can be of the type shown in FIG. 3, and by them sprayed onto the surface of a heated rotating drum 60. Slurry sprayed on the surface of drum 60 is dried thereon to the desired moisture level and transferred therefrom to the collector 61 by the doctor blade 62. Product from collector 61 goes as shown by the further dotted line flow arrows to further processing or packaging as desired. We have found that with a drum surface speed of about 65 feet per minute and drum surface temperatures of about 295°F we can obtain a fully dried unicellular product in the collector. By appropriate relative adjustment of spraying rate, drum speed, and temperature this may be varied from a fully dried, unicellular product ready for packaging to a product only dried down sufficiently not to adhere and in the form of damp lumps which can be advantageously processed by conditioning and further drying to a low-density multicellular granular product. In comparison with the drum drying of the flake process, no applicator rolls are required as the coating thickness is not critical since it can be readily varied as the moisture of the product leaving the drum is varied to avoid any significant cell damage or indeed even flavor variation from cell to cell. Further, in comparison with spray-drying in an air-stream, problems of cell damage during product collection are avoided.

Thus, it is seen that by selecting proper conditions, procedures, and particle sizes, we have a flexible process whereby it is possible to produce products ranging from all unicellular units to all multicellular units or any desired combination of the two. The selection of the exact process would be dictated by the proposed end use. For example, the Armed Forces would surely prefer the unicellular form because of savings in container costs and shipping space. On the other hand, the housewife might prefer the more bulky multicellular form which can be simply reconstituted without mixing or special equipment.

Products produced by drying the slurry of our invention have the distinctive character that, though granular, whether multicellular or unicellular or mixed, of absorbing in the range of 5.25–6 times their weight of liquid upon reconstitution, thus equalling or exceeding the performance of flakes in this respect, and of doing so without pastiness or loss of true mashed potato texture regardless of liquid temperature, thus exceeding the performance of flakes.

We claim:

1. In a process for the preparation from potatoes of an aqueous suspension having a potato solids content less than 17%, which, when dried by means which do not damage cells, yields a product from which palatable mashed potato of good quality can be prepared quickly by reconstitution in hot water, comprising the steps of:
    a. preparing the potatoes for cooking by washing, peeling and slicing in a conventional manner;
    b. cooking the prepared potatoes;
    c. mashing the cooked potatoes at a temperature between 130–150°F with the addition of water to produce a diluted mash containing about 10 to 17 percent potato solids, said diluted mash containing about 90 percent intact single potato cells with the balance in unmashed lumps on the order of one-fourth inch diameter; and
    d. finishing the diluted mash to substantially complete all separation without cell rupture and to separate unwanted debris from the potato cells by passing the diluted mash through a conventional fruit and vegetable finisher equipped with screens and paddles, operated at a reduced shaft speed of about 60 r.p.m., said finisher having screens with perforations in the range of 0.023 inches to 0.060 inches and having a paddle clearance altered by adjustment to about one-fourth inch from said screens.

2. The process of claim 1 in which the finished diluted mash is dried by spraying without cell damage into a dehydrating atmosphere.

3. The process of claim 1 in which the finished diluted mash is dried by spraying without cell damage onto a heated surface.

4. The process in which the product of claim 2 is:
    a. separated into a coarse fraction and a substantially entirely unicellular fine fraction;
    b. said fine fraction is moistened uniformly to a moisture content of between 20 to 40 percent while subjecting it to rolling and tumbling to form multicellular units; and
    c. drying said multicellular units.

5. The process of claim 3 in which the finished diluted mash is:
    a. removed from the heated surface before the completion of drying in the form of non-adhering dry lumps;
    b. said lumps are conditioned; and
    c. said conditioned lumps are dried to form a low density multicellular product.

6. The process of claim 1 in which said finished diluted mash is further processed by the steps of:
    a. partially drying said mash by dispersing into heated air in a dryer and forming some damp particles;
    b. forming multicellular units around said particles by brush sweeping said partially dried composite onto the floor of said dryer;
    c. equilibrating said units by moisture interchange to 6 to 14 percent moisture; and
    d. drying said equilibrated units.

* * * * *